United States Patent [19]

Lasher et al.

[11] Patent Number: 4,517,604
[45] Date of Patent: May 14, 1985

[54] METHOD FOR REDUCING LINE WIDTH VARIATIONS IN BILEVEL VIDEO IMAGES

[75] Inventors: Dana A. Lasher, Raleigh; William K. Stelzenmuller, Morrisville, both of N.C.

[73] Assignee: International Business Machines Corporation, Armonk, N.Y.

[21] Appl. No.: 481,610

[22] Filed: Apr. 4, 1983

[51] Int. Cl.³ .................... H04N 1/41; H04N 1/40
[52] U.S. Cl. ................... 358/262; 358/261; 358/280; 358/282; 382/56; 340/730
[58] Field of Search ........... 358/260, 261, 262, 282, 358/284, 280; 382/56, 55, 50, 53; 340/728, 730, 793

[56] References Cited

U.S. PATENT DOCUMENTS

| 3,192,315 | 6/1965 | Remley | 358/133 |
|---|---|---|---|
| 3,649,751 | 3/1972 | So | 358/262 |
| 3,651,251 | 3/1972 | Clark | 358/262 |
| 3,920,898 | 11/1975 | Torpie | 358/262 |
| 4,010,446 | 3/1977 | Kawa | 382/55 |
| 4,204,232 | 5/1980 | Mizuno | 382/56 |
| 4,454,506 | 6/1984 | Netravali et al. | 340/728 |
| 4,476,495 | 10/1984 | Fujisawa et al. | 358/262 |

Primary Examiner—John C. Martin
Assistant Examiner—Edward L. Coles
Attorney, Agent, or Firm—Gerald R. Woods

[57] ABSTRACT

For use in a teleconference system, a method of reducing line width variations, which are assumed to be the result of undersampling of the original image. Bilevel data received at a remote site is written into a pair of two-dimensional storage arrays. Data stored in the first array is examined row by row to identify different length-dependent classes of black horizontal pel runs. White or black pels in the second array are overwritten with gray pels at specific pel locations as a function of run length to reduce variations in length. The first array data is then examined on a column by column basis. Black vertical runs are classified and the second array is overwritten with gray pels using the same rules as were applied to horizontal runs. The trilevel second array data may be used to drive a display monitor or may first be subjected to further image processing.

8 Claims, 21 Drawing Figures

METHOD FOR REDUCING LINE WIDTH VARIATIONS IN BILEVEL VIDEO IMAGES

BACKGROUND OF THE INVENTION

The present invention relates to video image processing and more particularly to a method for reducing line width variations in bilevel video images captured at low sampling rates.

Because travel costs are rising and because a traveler's time in transit can seldom be used productively, there is an increasing interest in the use of teleconferencing as an alternative to face to face business meetings between people from different locations. In a typical teleconferencing system, people in different cities or even different countries meet in special teleconferencing rooms at their respective home locations. Each room normally includes a room camera for capturing a wide angle view of the people, a document camera which can be focussed on letters, drawings or other documents, a room monitor for permitting people in one room to see those in the other, and a document monitor for viewing documents being presented in the other room. Communications between the two rooms are established over conventional teleprocessing links, such as leased or switched telephone lines or satellite communication channels.

To reduce communications costs, freeze-frame teleconferencing techniques are often employed. The video image captured by a room camera is updated only periodically, perhaps on the order of once every 30 seconds. People at the receiver see the same "frozen" room image between updates. Audio signals are transmitted on a "real time" basis so that there is no significant delay in voice communications. Document images are updated only when the person presenting a document pushes a "send" button in the teleconferencing room.

After a "send" button is pushed, the image of the presented document does not appear immediately on a display or monitor in the receiving teleconferencing room. A finite period of time is required to scan, capture and process image data at the originating teleconferencing room, to transmit the processed data over teleprocessing links and to process data at the receiving teleconferencing room in order to reconstruct the image of the presented document. The length of the delay can be critical in a teleconferencing system. Delays exceeding a few seconds produce unnatural pauses in the smooth flow of a business meeting.

The length of the delay is generally proportional to the amount of data which must be transmitted in order to construct an acceptable video image and is inversely proportional to the bandwidth of the teleprocessing link over which the data must be transmitted. While the amount of delay can be reduced by using a higher bandwidth channel, the drawback to this approach is that communications costs are a function of required bandwidth. Therefore, it is desirable to use as little bandwidth as possible.

Attempts have been made to minimize delay time and to maintain low communication costs by compressing the amount of data which must be transmitted over a low bandwidth channel in order to reconstruct a video image of a presented document. For example, documents which are normally bilevel (e.g., black printing on white paper) can be digitized by assigning a binary value to each picture element pel captured by the camera scanning the document. Each pel would represent either black or white. The binary data can be encoded using known two-dimensional run length encoding techniques to significantly reduce the amount of data which must be transmitted.

Another technique for minimizing transmission delay and communication costs has been to reduce the scanning resolution at which the original image is scanned and encoded. Instead of scanning at 40 picture elements or pels per inch, the scanning rate may be reduced to 20 or even 10 pels per inch. The amount of data which must be encoded and transmitted is directly related to the scanning rate. Therefore, a lower scanning rate can reduce transmission delays and communication costs.

However, video images captured at reduced sampling rate can become distorted. One type of distortion is unintended variations in line widths. Most business documents presented during teleconferencing sessions consist primarily of typed, printed or hand-lettered text with some graphs or line drawing. In such materials, the lines in the alphanumeric characters and in the graphs usually have the same nominal width. When such a document is scanned at low resolutions, however, certain alignments between the scan pel positions and a line on the image may cause lines of the same nominal width to be represented by different numbers of pels of a certain value. When the image is reconstructed on a video display at a remote teleconferencing site, the resulting variations in line width cause the displayed document to take on an odd, visually irritating appearance. Even though a visually irritating document may still be comprehensible to teleconferencing participants who are viewing it, such a document can still have a negative psychological impact on the smooth conduct and effectiveness of presentations or discussions.

One solution to the problem of line width variations would be, of course, to increase the sampling resolution. However, increased sampling resolution leads to increased transmission delays and increased communications costs which were to be avoided in the first place.

SUMMARY OF THE INVENTION

The present invention is a method for reducing line width variations in a video image originally captured at a relatively low scanning rate.

The system within which the method is practiced is one in which image pel data is thresholded to bilevel format before being transmitted to the remote location. The remote location must have a video monitor capable of displaying at least three different pel values. The method, which is practiced at the receiving location, calls for the analysis of received bilevel data along at least one pel direction to identify regions which consist of a run of one or more pels having a first bilevel value bounded at both ends by one or more pels having a second bilevel value. Pels at or adjacent the ends of selected runs are converted to a third intermediate value as a function of run length in a way which tends to minimize the perceptible variation in run lengths.

BRIEF DESCRIPTION OF THE DRAWINGS

While the specification concludes with claims particularly pointing out and distinctly claiming that which is regarded as the present invention, details of a preferred embodiment may be more readily ascertained from the following technical description when read in conjunction with the accompanying drawings wherein:

FIG. 10, consisting of FIGS. 10A through 10F taken together, is a more detailed flow chart of the method;

TECHNICAL DESCRIPTION

Figure 1:
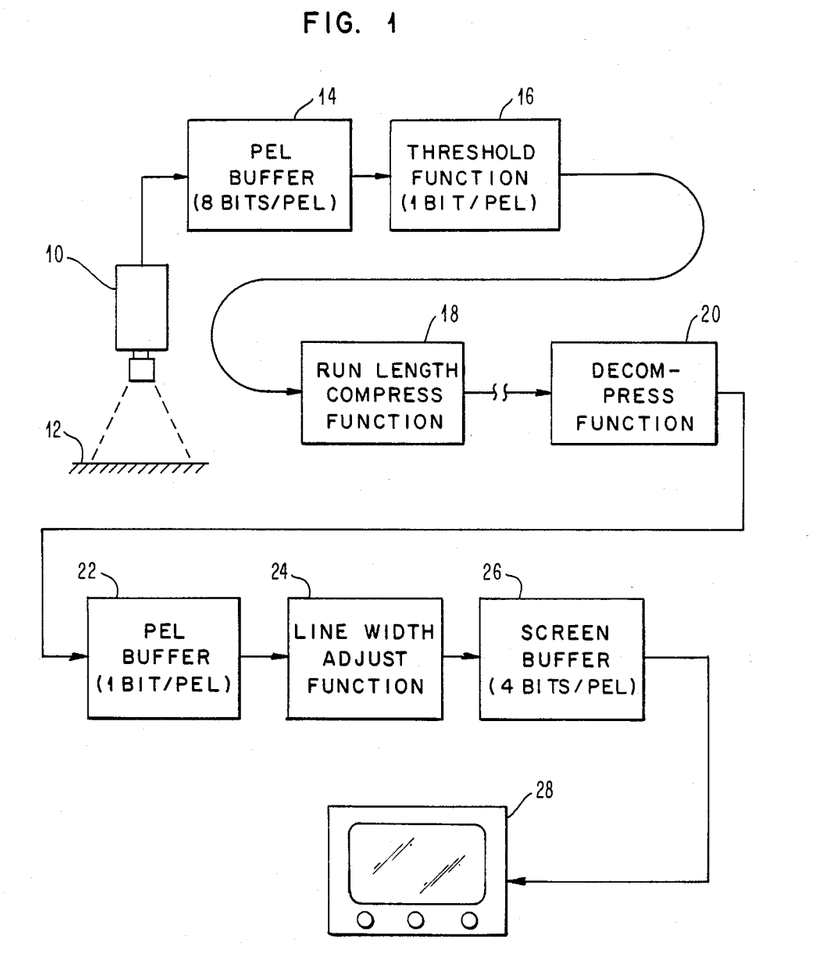
FIG. 1 is a block diagram of a system in which the present invention may be practiced.

FIG. 1 is a greatly simplified block diagram of elements of a teleconferencing system that are relevant to the present invention. A conventional raster scan video camera 10 is focussed at a surface 12 on which a business document may be placed. The camera 10 scans the entire document and converts the resulting analog signals to digital format using conventional A/D circuitry (not shown). The resulting digital data is stored in a pel buffer 14, typically at an initial resolution of 8 bits per pel or 256 levels of gray. Through the use of conventional thresholding operations, represented by function 16, the captured data can be reduced from a resolution of 8 bits per pel to 1 bit per pel. The data can be further compressed using conventional compression techniques in a function 18 before being transmitted over a telecommunications link 20 to a remote teleconferencing site. At the remote site, the run length compressed data is decompressed in a function 20 before being stored in a pel buffer 22 at a resolution of 1 bit per pel. A resolution of 1 bit per pel means that each pel is considered either to be black or white. There can be no intermediate gray scale values for bilevel data. The data stored in buffer 22 is examined and adjusted in a line width adjust function 24 to reduce perceptible variations in the widths of presumably uniform lines in the data. The line width adjust function 24 introduces a third pel value which is a gray value intermediate the black and white values which existed prior to the function.

The trilevel data may be loaded into a screen buffer 26. Through the use of enhancement algorithms or routines which are not considered to be within the scope of this invention, the resolution of the data can be increased to 4 bits per pel or 16 levels of gray before the data is applied to a monochrome monitor 28 at the receiving teleconferencing site.

In the foregoing description, the term "function" is used where either hardware or software might be used for the indicated purpose. Also, while FIG. 1 generally describes an entire teleconferencing system from camera to monitor, the present invention pertains solely to the line width adjust function 24. The remainder of the technical description is limited to a description of that function beginning with the bilevel data available from pel buffer 22 and ending with trilevel data which is outputted to screen buffer 26.

Figure 2:
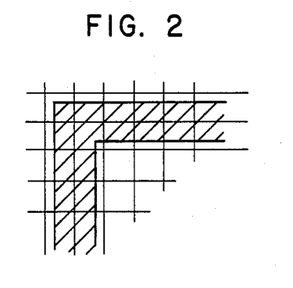
FIG. 2 is an enlarged view of a partial character image with defined scan pel locations.
Figure 3:
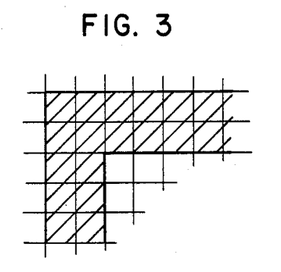
FIG. 3 shows the captured image which normally results from a scan of the type defined by FIG. 2.
Figure 4:
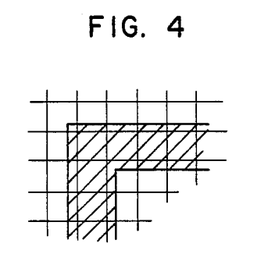
FIG. 4 shows the same partial character image as FIG. 2 but with a different relative alignment between the scan pel locations and the partial character.
Figure 5:
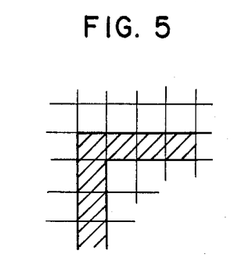
FIG. 5 shows the captured image which normally results from a scan of the type defined by FIG. 4.

FIGS. 2 through 5 show how bilevel data captured by scanning the same character can vary as a result of shifts in alignment between the character and the positions of the scanning pels. In FIGS. 2 and 4, the right angle image areas are the same size. The figures differ from one another in the relative positions of the scanning pels. In FIG. 2, the boundary between adjacent scanning pels is centered roughly on the centerlines of the image components. Assuming any pel area which is more than 50% black is recorded as a "black" pel, the captured image appears to consist of lines which are two pels wide, as shown in FIG. 3. In FIG. 4, the centerlines of the scanning pels are aligned with the centerlines of the image components. Referring to FIG. 5, the captured image would appear to consist of lines one pel in width.

Thus, depending on the relative alignment between the scanning pel locations and the image being scanned, there may be a two to one variation in captured line widths for the same scanned image.

Figure 6:
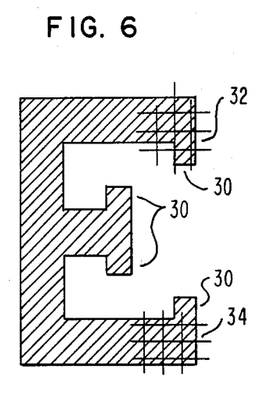
FIG. 6 is an enlarged view of a single character which might be scanned during a data capture operation.
Figure 7:
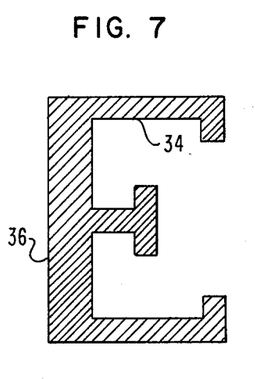
FIG. 7 depicts the bilevel pels which are generated when the character presented in FIG. 6 is scanned with one specific pel alignment.
Figure 8:
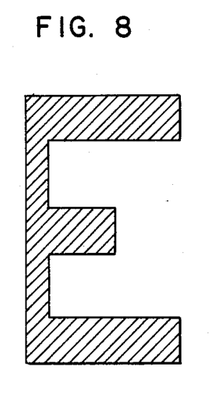
FIG. 8 depicts the bilevel pels which are generated when the FIG. 6 character is scanned at the same sampling rate but with a different relative pel alignment than that of FIG. 7.

FIGS. 6 through 8 are more graphic examples of the type of distortion which can result when the same character is scanned with different relative alignments between the character and the scanning pels. The assumption that is made is that any pel area which is more than 50% black when the original character is scanned would be recorded as a black pel, while any original pel area which is less than 50% black would be recorded as a white pel. In FIG. 6, two partial grids 32 and 34 are shown as being superimposed upon the character. The grids 32 and 34 represent two different relative alignments of scan pel locations to the character. If the letter "E" shown in FIG. 6 is scanned with pels having the size and orientation shown in grid 32, the captured bilevel data defines the character shown in FIG. 7. It can be seen that the horizontal components of the character (for example, component 34) are thinner than corresponding components in the original character while vertical components (for example, spine 36) retain their original width.

When the same "E" character is scanned with scanning pels having the size and orientation represented by partial grid 34, a character defined by captured bilevel data takes on the different appearance shown in FIG. 8. The horizontal components of this figure substantially retain the original width, while the vertical components are thinner than corresponding components in the original character. The FIG. 8 character is further distorted relative to the original character in that accents 30 at the distal ends of the components are lost.

As will be explained in more detail later, the present invention will reduce variations in line thicknesses and widths which are the result of low sampling rates; that is, undersampling. The present invention will not remove every distortion resulting from undersampling.

For example, the lost accents 30 will not be restored if the data represented by FIG. 8 is processed in accordance with the method. However, the objective is not to faithfully reproduce the original character but is to derive a more aesthetic, comprehendible image with a minimum amount of data. The absence of character accents or similar details from the reproduced image is not considered critical.

Bilevel sampling of a uniform thickness line causes random variations in the resulting line thickness. These variations are one pel in amplitude and are very obvious and disconcerting for thin lines where the percent variation becomes large. A line varying in thickness between one and two pels is varying 100% while a line varying between 10 and 11 pels is only varying 10%. To improve the visual appearance of undersampled text and graphic documents, very thin lines are adjusted to a perceived uniform thickness.

Generally, the method for reducing line width variations resulting from undersampling is as follows. Data received at a remote teleconferencing site is stored in a pel buffer in memory locations corresponding to the pel locations of the display monitor at the site. The stored data is examined one row at a time and runs of black pels bounded at both ends by one or more white pels are identified. Short black runs are effectively lengthened by changing the white pels at both ends to gray pels. Intermediate runs of black pels are effectively shortened by converting the black pels at both ends of the run to gray pels. Longer black pel runs are not altered. Similarly, black pel runs having a length between the extremely short runs and the low end of the intermediate values are not altered.

Adding one gray pel to the end of a run of black pels has the visual effect of increasing the length of the black run by approximately ½ pel. Likewise, converting the last black pel in a run of black pels to gray has the visual effect of shortening the run by approximately ½ pel. Therefore, black runs may be visually lengthened or shortened approximately one pel by the use of gray pels at each end. This technique for modifying the length of a black run has the important advantage that the visual center of a line does not shift, as would be the case if one black pel were simply added to either end of the run.

When the row-by-row analysis and conversion has been completed, the bilevel data is examined on a column-by-column basis and black or white pels are converted to gray pels using the same rules that are applied during the row-by-row analysis.

Figure 9:
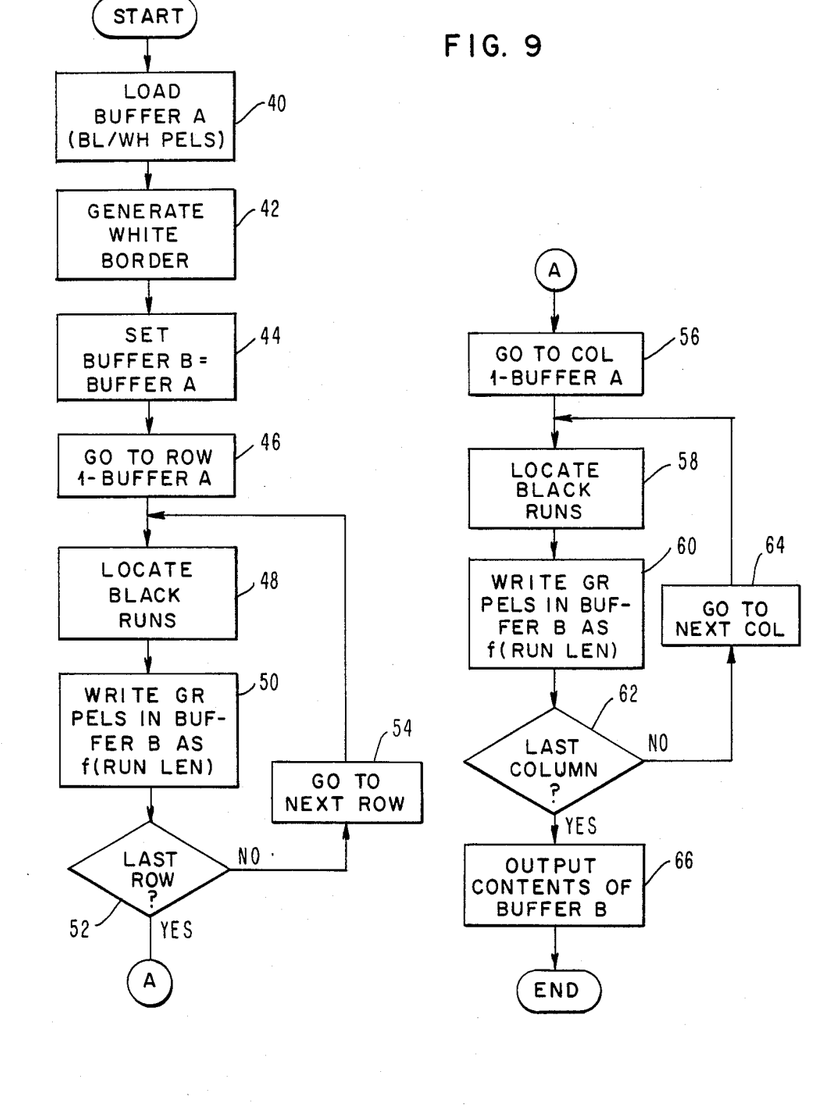
FIG. 9 is a simplified flow chart of the inventive method for reducing line width variations.

FIG. 9 is a simplified flowchart of the inventive method. It is assumed, at the start, that bilevel image pel data has been received from a remote teleconferencing site and that the pel data has been stored in a full screen pel buffer with memory locations arranged in logical rows and logical columns corresponding to the pel locations of the display monitor. At the start, data stored in the full screen pel buffer is loaded (block 40) into a buffer A. To allow for the eventual introduction of a gray pel type, each pel is preferably defined by a 2 bit word with black pels being represented by the binary word "10" and white pels being represented by the binary word "00". When buffer A has been loaded, a white border is generated (block 42) by writing the binary word "00" into each location defining the top row, the bottom row, the leftmost column and the rightmost column of the display. Any black pels originally stored in those rows and columns are lost. The contents of buffer A are then replicated (block 44) in a second buffer B. Buffer B will ultimately contain the output data resulting from performance of the method.

After the replication has been completed, analysis of data stored in buffer A begins with the row-by-row analysis beginning at row 1 (block 46). Runs of black pels are located (block 48). A run of black pels is defined as any number of consecutive black pels bounded at both ends by one or more consecutive white pels. If the length of the line is considered to be 384 pels, the maximum black run length would be 382 pels while the minimum black run length would be 1 pel.

As the length of each run is established, pel locations in buffer B corresponding either to the endmost black pels in the run or white pels flanking the run may be overwritten with the binary word "01" representing a gray pel. In a preferred embodiment, each black run which is only 1 pel in length is effectively "stretched" by converting the flanking white pels to gray. Runs having a length within a certain range of intermediate values, such as 3 to 6 pels, are effectively shortened by converting the endmost black pels in the run to gray pels. Thus, generally speaking, gray pels are written into buffer B (block 50) as a function of the run length. When an analysis of the row has been completed, a check is made (block 52) as to whether the analysis has been for the last row in the display. If not, the next row is selected (block 54) and the analysis is continued.

It should be noted that the data stored in buffer A is not changed as a result of the row-by-row analysis. Only the data stored in buffer B is changed. After the row-by-row analysis is completed, the same type of analysis is carried out a second time on the data stored in buffer A. The second analysis is on a column-by-column basis, beginning with column 1 (block 56). The black runs are located (block 58) and gray pel values are written into buffer B (block 60) as a function of the length of the vertical runs. When each column has been analyzed, a check is made (block 62) to determine whether more columns remain to be analyzed. Unless all columns have been analyzed, the analysis of the next column begins (block 64). When all columns have been analyzed, the now trilevel contents of buffer B can be outputted (block 66) or made available for further image enhancing processing.

FIG. 10, consisting of FIGS. 10A through 10F taken together, is a more detailed flow chart of a preferred embodiment of the inventive method. The detailed flow chart is not specific to a particular programming language, but could be used to prepare suitable programs in any of a number of available languages.

Figure 10A:
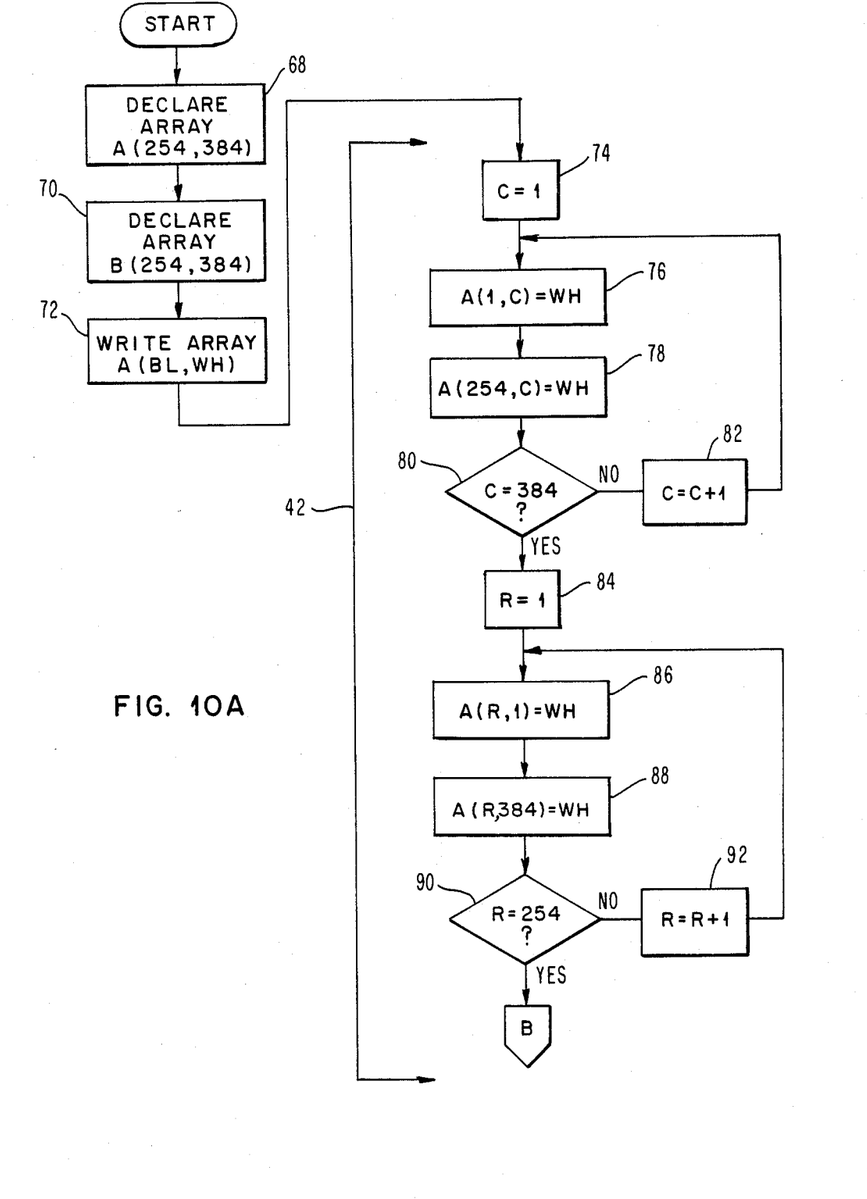

The dimensions of the buffers or arrays A and B required to store the pel information must be established or declared in operations 68 and 70 during initialization. For purposes of illustration, it is assumed that a full screen of information would consist of 254 rows of pels with each row being 384 pels long. After the arrays are dimensioned, the first array or buffer A must be written (block 72) with the bilevel data produced upon decompression of received data. As mentioned earlier, each pel is preferably defined by a 2 bit binary word. After array A is written or loaded, the surrounding white border is generated in a series of steps included within the general step 42 discussed with reference to FIG. 9. Beginning at the first column (block 74) of the display area, a white pel value is written into the first row (block 76) and the last row in that column. If a column variable C is found to be less than a maximum value (block 80) the variable is incremented (block 82) and the loop consisting of operations 76, 78 and 80 is reiterated. The loop will be followed repeatedly until operation 80 shows that the column variable C has reached the maximum permissible column value. At that point, the pels in first and last rows of the display will have been overwritten with white pel values.

The value of the row variable R is then set to 1 (block 84) and the pels stored in the first and last columns in that row are overwritten with white pel values in operations 86 and 88. A check (block 90) is made whether the value of the row variable R is equal to a maximum permissible value. If not, the row variable R is incremented (block 92) and the writing operations identified by blocks 86 and 88 are repeated for the next row. The operations performed in the loop defined by blocks 86, 88, 90 and 92 are reiterated until operation 90 shows that the row variable R has reached the maximum permissible value. At this point, both the leftmost and rightmost columns in the display area will contain white pel values, thus completing the white border around the display area.

Figure 10B:
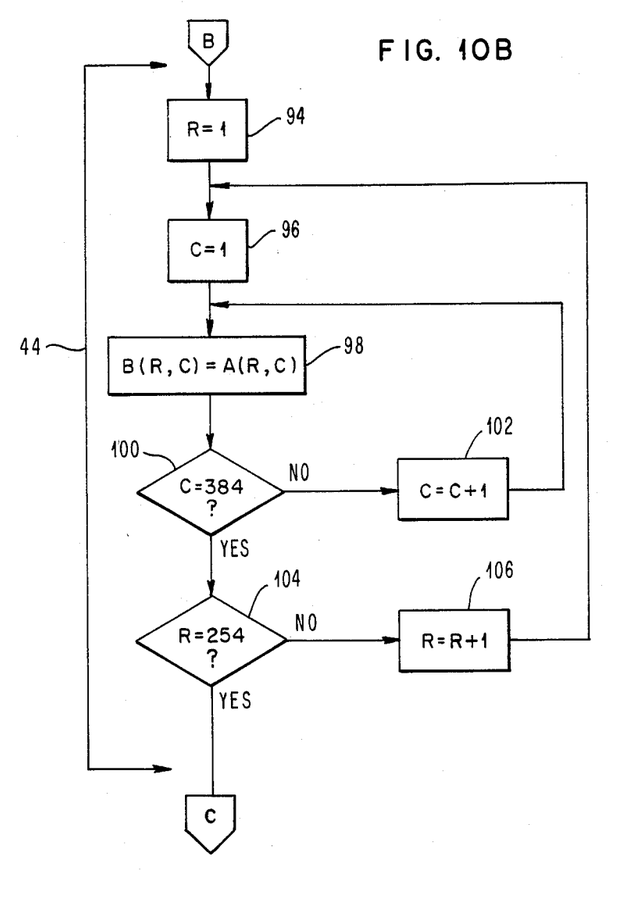

The contents of array A must be replicated in array B in the series of steps included within the general step 44 described with reference to FIG. 9. FIG. 10B illustrates the necessary steps in greater detail. The values of the row variable R and the column variable C are initialized at one (blocks 94 and 96) and the contents of the array location 1,1 in array B is set equal to the contents of the corresponding array location 1,1 in array A (block 98). If a check (block 100) shows that the column variable C is not equal to 384, the value of that variable is incremented (block 102) and the contents of the next column in the same row of array A are replicated in array B. The loop consisting of operations 98, 100 and 102 continues until the column variable C contains the maximum value of 384, indicating that the last column in a given row in array A has been replicated into array B. At that point, another check (block 104) is made to determine whether the row variable R has attained its maximum value of 254. If not, the row variable is incremented (block 106) and the replication process is restarted at the first column in the next row. The replication process continues on a row-by-row basis until array B is fully written.

Figure 10C:
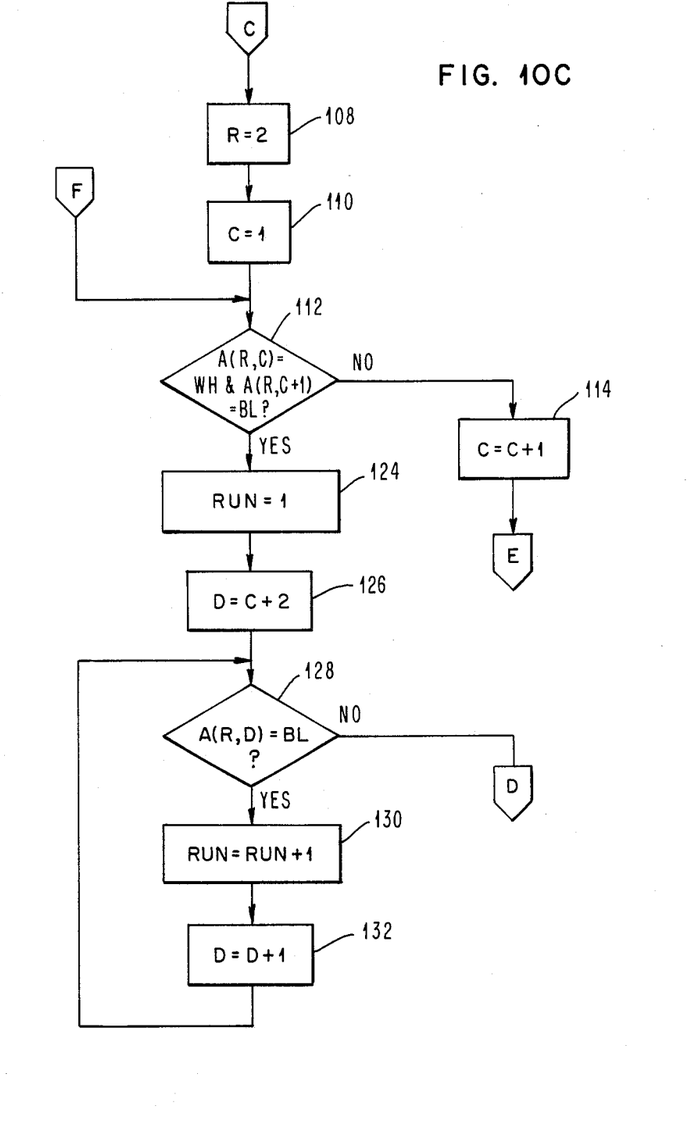
Figure 10D:
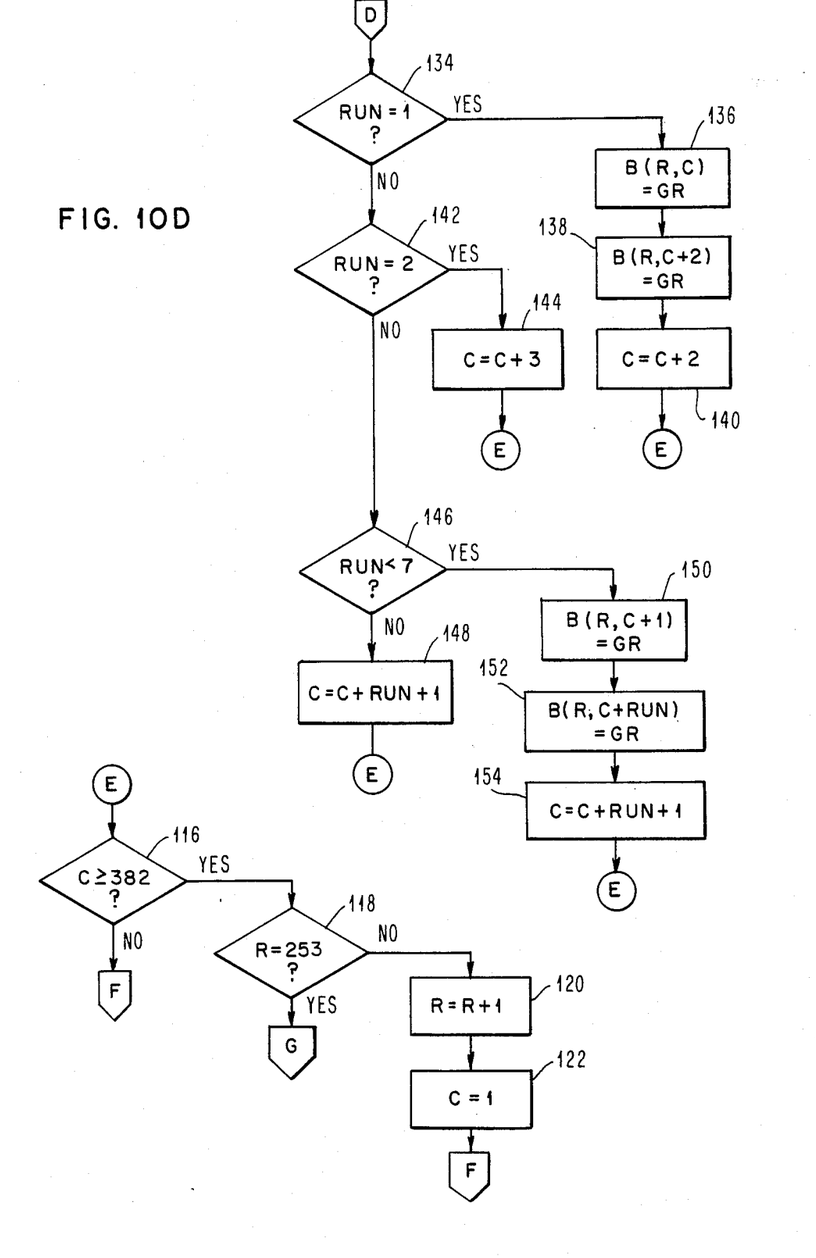

At this point, the operations necessary to locate horizontal black runs and to write gray pel values into array B to reduce variations in the length of those runs are begun. In the general description of the method referencing FIG. 9, the run locating step 58 and the gray pel writing step 60 are described as if they occurred in sequence. It would be possible to implement the present invention in such a fashion. However, in a preferred embodiment the step of writing gray pel values where appropriate to reduce line width variations is performed within each row or on a run-by-run basis as each run is identified and its size is established. FIGS. 10C and 10D is a more detailed illustration of the steps required for the row-by-row analysis and conversions.

Since row 1 of the display array is part of the generated white border, the analysis begins with row 2. The row and column variables are initialized in steps 108 and 110. In operation 112, a decision is made as to whether the pel stored in a given row and column is white while the pel stored in the same row and the next column is black. Since the pels in the first column are part of the white border, the first of the two conditions is always satisfied at the beginning of a row. If the second pel in the compared pair is not black, the value of the column variable C is incremented (block 114) and a check is made (block 116) to determine whether the column variable has reached its maximum value. Assuming that it has not, the program reiterates operation 112 where the comparison is now between the next two pels. The sequence of steps defined as operations 112, 114 and 116 will cause comparisons between adjacent pels to "ripple" along a row until one of two conditions are found. The first condition occurs when operation 116 shows that the column variable C has reached a maximum value. When that condition occurs, a check 118 is made to determine whether the row variable R has reached its maximum value. If it has not, the row variable is incremented (block 120) and the column variable is reset to 1 (block 122) to cause the row-by-row analysis to resume at the beginning of the next row.

The second condition under which the loop consisting of steps 112, 114 and 116 is interrupted is where step 112 yields a positive result; that is, a first pel of the compared pair is white while the adjacent, second pel is black. When that occurs, the value of a run length variable RUN is set at 1 (block 124) and a temporary variable D is set equal to C+2 (block 126) where C is the current value of the column variable. D serves as a pointer to the next pel in the row beyond the two pels compared in operation 112. A check is made (block 128) to determine whether this next pel is black. Assuming the results of check 128 are positive, the value of the variable RUN is incremented (block 130) as is the value of the variable D (block 132). The loop consisting of steps 128, 130 and 132 continues to be carried out until check 128 produces a negative result; i.e., a white pel is encountered at the end of a run of black pels. At that point, a black run has been located and the size of that run has been established by the value of the variable RUN.

The specific steps of writing gray pels into certain locations in array B differ as a function of the value of the variable RUN. The first check that is made (block 134) is whether the run was one pel in length. Such a run is effectively lengthened by converting the preceding and following white pels to gray. The single black pel occurs at an array location R,C+1. To effectively lengthen this run, the white pels at locations R,C and R,C+2 in array B are converted to gray in operations 136 and 138. The value of the column variable C is incremented by 2 (block 140) and the limit checks identified as blocks 116 and 118 are performed before the pel-to-pel comparison of block 112 is resumed.

If the response to check 134 was negative, the next run length check (block 142) determines whether the run length is 2 pels. If the run length is 2 pels, the run is not altered. No gray pel values are written into array B in this case. The value of the column value C is incremented by 3 (block 144) and the limit checks identified by block 116 and 118 are again performed before the pel-to-pel comparisons of operation 112 are resumed.

Negative responses at checks 134 and 142 indicate the run length is greater than 2. The final run length check (block 146) during the row by row analysis determines whether the run length is less than 7. If the run length is equal to or greater than 7, the run is not altered. The value of the column variable C is incremented by RUN+1 (block 148) which permits the pel to pel comparisons to resume beginning with the first white pel following the long run.

Assuming check 146 reveals that the run length is in the range of 3 to 6 pels in length, the perceptible length of the run is shortened by writing a gray pel into the array B locations for the first black pel (block 150) and the last black pel (block 152) in the run. The value of the column variable C is incremented by RUN+1 (block 154) before the limit checks represented by blocks 116 and 118 are performed.

The analysis described above continues on a row by row basis until every row excluding the bottom white border row has been analyzed and gray pels have been written into the appropriate locations in array B. At this point, a column-by-column analysis described with reference to FIGS. 10E and 10F begins.

Figure 10E:
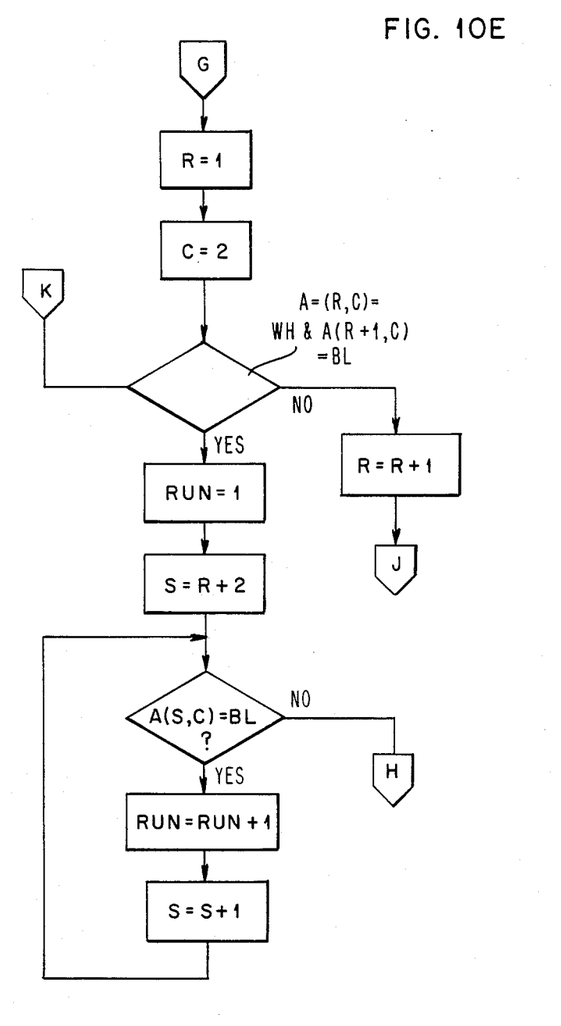
Figure 10F:
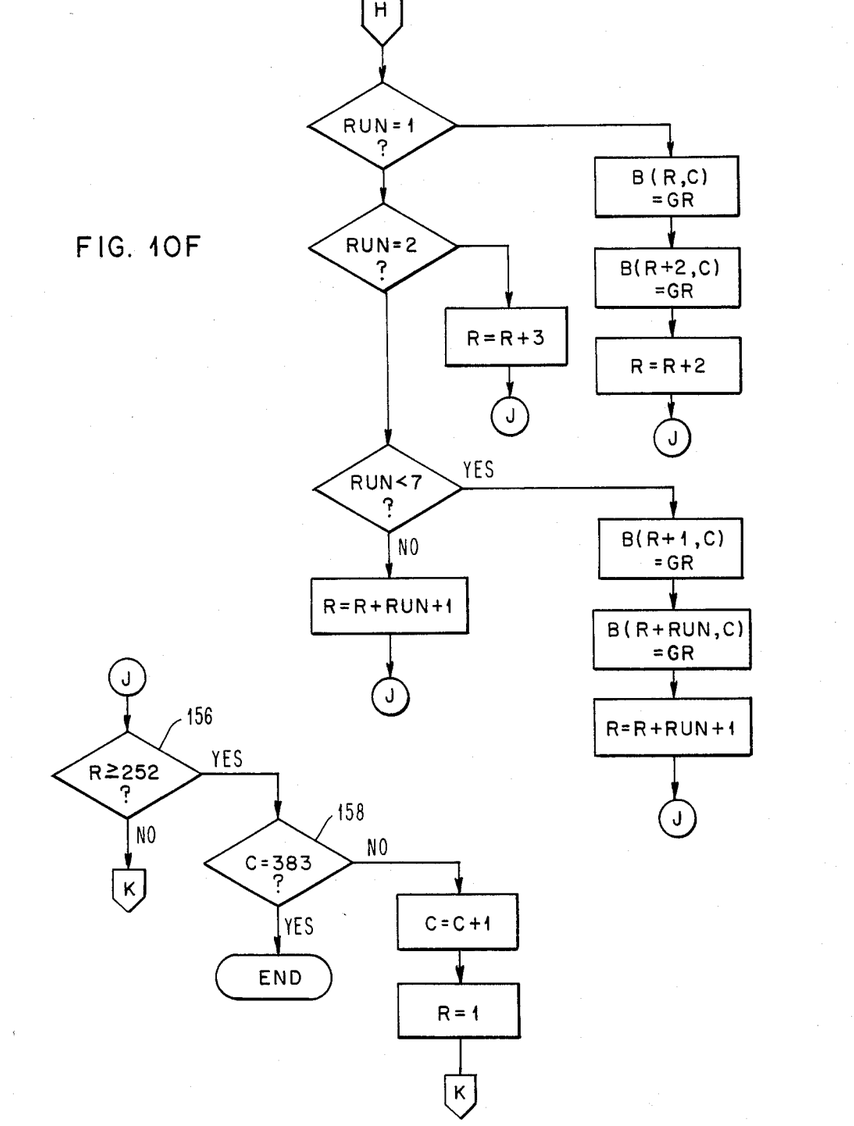

From a logical point of view, the column-by-column analysis is essentially identical to the row-by-row analysis. The lengths of individual vertical runs of black pels are established and gray pels are written into appropriate locations in array B as a function of the length of the vertical runs. The only difference between the column by column analysis and the row-by-row analysis is that the roles of the row and column variables are switched with the row variable R being incremented as appropriate within each column to permit one pel to be compared to the succeeding pel in the same column but next row.

The analysis defined by the flow chart in FIG. 10C continues until a row limit check 156 and a column limit check 158 both yield positive responses, indicating the last two pels in the last column to be analyzed have been compared. The trilevel (black, gray, white) pel values stored in array B can be made available for further image processing operations, if desired.

Figure 11:
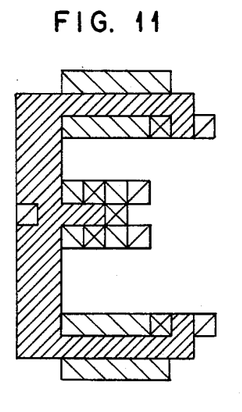
FIG. 11 depicts a trilevel image which is generated when the bilevel data represented by FIG. 7 is processed in accordance with the present invention.
Figure 12:
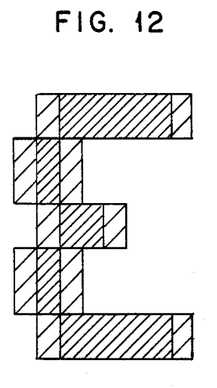
FIG. 12 depicts a trilevel image which results when the bilevel data represented by FIG. 8 is processed in accordance with the present invention.
Figure 13:
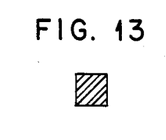
FIGS. 13 through 16 are a legend for decoding the values of individual pels represented in FIGS. 11 and 12.
Figure 14:
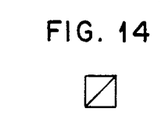
Figure 15:
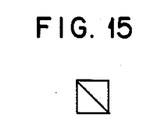
Figure 16:
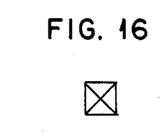

FIGS. 11 and 12 illustrate the appearance of the bilevel characters in FIGS. 7 and 8, respectively after the pel data defining those characters is processed in accordance with the described method. FIGS. 13 through 16 are codes to the pel values shown in FIGS. 11 and 12. Any pel having the appearance of FIG. 13 is considered to be a black pel. Pels of the type shown in FIG. 14 are gray pels which are established during the row-by-row analysis. Pels of the type shown in FIG. 15 are gray pels established only during the column-by-column analysis. Pels of the type shown in FIG. 16 are gray pels which are generated for a particular pel location during both the row-by-row and the column-by-column analysis.

The characters which result from operation of the present method are not, of course, true reproductions of the original character that is shown in FIG. 6. True reproductions are possible only where considerably greater amounts of data are transmitted for each character. Also, it is acknowledged that the method introduces some distortions which do not exist in the bilevel characters represented by the initial data. For example, comparing the FIG. 11 character to its original FIG. 7 character, it can be seen that the accents on the center bar are reduced from black to gray while a gray notch is created in the spine in the FIG. 11 character at the middle stroke.

These distortions do not detract significantly from the readability of the character.

The significant comparison is between the characters of FIG. 11 and FIG. 12. In comparing the two characters using the codes defined by FIGS. 13–16, it can be seen that variations in both the horizontal and vertical components of the character have been reduced. In FIG. 11, the thin horizontal components have been widened by the addition of gray pels. In FIG. 12, thin vertical components have been widened by adding gray pels.

While there has been described what is considered to be a preferred embodiment of the invention, variations and modifications therein will occur to those skilled in the art once they are made aware of the basic concepts of the invention. Therefore, it is intended that the appended claims shall be construed to include both the preferred embodiment and all such variations and modifications as fall within the true spirit and scope of the invention.

Having thus described our invention with reference to a preferred embodiment therein, what we desire to protect by Letters Patent is:

1. For use in a system wherein image pel data is thresholded to bilevel format for transmission to a remote display capable of producing at least trilevel pels, a method of reducing perceptible variations in the widths of lines in the image to be displayed, said method being characterized by the steps of:
   analyzing received bilevel data along at least one pel direction to identify regions, each consisting of a run of one or more pels having a first bilevel value bounded at both ends by one or more pels having the second bilevel value; and
   converting the pels at or adjacent the ends of selected ones of the runs as a function of run length to provide run-bordering pels having a third value intermediate the bilevel values.

2. For use in a system wherein image pel data is thresholded to bilevel format for transmission to a remote display capable of producing at least trilevel pels, a method of reducing perceptible variations in the width of lines in the image to be displayed, said method being characterized by the steps of:
   analyzing received bilevel data along at least one pel direction to identifying regions, each consisting of a run of one or more black pels bounded at both ends by one or more white pels; and
   converting the pels at or adjacent the end pels of selected ones of the runs as a function of run length to provide gray run-bordering pels.

3. A method as recited in claim 2 wherein the converting step includes the steps of:
   converting white pels adjacent runs of less than a predetermined length to gray pels to increase the perceptible length of such runs;
   converting black end pels of runs of lengths within a predetermined range to gray to reduce the perceptible length of such runs; and
   leaving unchanged any run having a length other than the predetermined length or within the predetermined range.

4. In an image processing system, a method of processing bilevel image pel data to reduce perceptible variations in line widths in an image to be displayed comprising the steps of:
   establishing first and second initially identical two-dimensional storage arrays of bilevel pel data representing an image to be displayed, said arrays being arranged in logical rows and columns of display pel locations;
   analyzing data stored in successive logical rows in the first array to identify horizontal runs of at least one black pel bounded at each end by at least one white pel; and
   writing gray pel data into specific storage locations in the second array corresponding to the storage locations of pels at or adjacent the ends of selected horizontal runs found in the first array, said writing step being performed as a function of run length.

5. A method as defined in claim 4 wherein the analyzing step comprises the specific steps of analyzing the stored data to identify:
- a first class of horizontal runs each having a first predetermined number of black pels;
- a second class of horizontal runs each having a number of black pels falling within a range which excludes the first predetermined number; and
- a third class of horizontal runs including all runs not falling within the first or second classes.

6. A method as defined in claim 5 wherein the writing step comprises the specific steps of:
- writing a gray pel value into second array pel locations corresponding to locations of white pels adjacent both ends of each horizontal run of the first class found in the array; and
- writing a gray pel value into second array pel locations corresponding to locations of black pels at both ends of each horizontal run of the second class found in the first array.

7. A method as defined in claim 6 further including the steps of:
- analyzing data stored in successive logical columns in the first array to identify vertical runs of at least one black pel bounded at each end by at least one white pel; and
- writing gray pel data into specific storage locations in the second array corresponding to the storage locations of pels at or adjacent the ends of selected vertical runs found in the first array, said writing step being performed as a function of vertical run length.

8. A method as defined in claim 7 wherein the identified vertical runs are segregated into three classes having the same definitions as the classes of horizontal runs.

* * * * *